United States Patent
Arai et al.

(10) Patent No.: US 11,694,750 B2
(45) Date of Patent: Jul. 4, 2023

(54) MEMORY SYSTEM, MEMORY DEVICE, AND CONTROL METHOD OF MEMORY SYSTEM FOR GENERATING INFORMATION FROM A THRESHOLD VOLTAGE

(71) Applicant: Kioxia Corporation, Tokyo (JP)

(72) Inventors: Yasunori Arai, Kawasaki (JP); Norio Aoyama, Machida (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/176,213

(22) Filed: Feb. 16, 2021

(65) Prior Publication Data
US 2021/0304819 A1    Sep. 30, 2021

(30) Foreign Application Priority Data
Mar. 30, 2020   (JP) .................. 2020-060809

(51) Int. Cl.
| | | |
|---|---|---|
| G11C 16/04 | (2006.01) | |
| G11C 16/10 | (2006.01) | |
| G06F 21/60 | (2013.01) | |
| G11C 11/56 | (2006.01) | |
| H10B 41/27 | (2023.01) | |
| H10B 43/27 | (2023.01) | |

(52) U.S. Cl.
CPC .......... G11C 16/0483 (2013.01); G06F 21/60 (2013.01); G11C 16/10 (2013.01); *G11C 11/5621* (2013.01); *G11C 11/5671* (2013.01); *H10B 41/27* (2023.02); *H10B 43/27* (2023.02)

(58) Field of Classification Search
CPC . G11C 16/0483; G11C 16/10; G11C 11/5621; G11C 11/5671; G11C 11/5642; G11C 16/26; G11C 11/5628; G11C 16/22; G06F 21/60; G06F 21/64; G06F 21/44; H01L 27/11556; H01L 27/11582
USPC .................................................. 365/185.11
See application file for complete search history.

(56) References Cited

U.S. PATENT DOCUMENTS

| | | | | |
|---|---|---|---|---|
| 8,782,804 B2* | 7/2014 | Nagai | .............. | G11B 20/00137 |
| | | | | 726/28 |
| 8,902,651 B2* | 12/2014 | Kwak | .................... | G11C 16/08 |
| | | | | 365/185.17 |
| 9,977,627 B1* | 5/2018 | Hung | ................. | G11C 16/3431 |
| 2013/0117633 A1 | 5/2013 | Matsukawa et al. | | |

(Continued)

FOREIGN PATENT DOCUMENTS

JP          2012-14416 A         1/2012

*Primary Examiner* — Tha-O H Bui
(74) *Attorney, Agent, or Firm* — Oblon, McClelland, Maier & Neustadt, L.L.P.

(57) ABSTRACT

According to one embodiment, a memory system includes: a memory device to store data; and a controller to control an operation for the memory device. The memory device executes a program operation by a first program voltage on memory cells belonging to a first address of the memory device; detect at least one first memory cell among the memory cells by using a first determination level and a second determination level different from the first determination level, the at least one first memory cell having a threshold voltage of a value different from a value between the first determination level and the second determination level; and generate unique information of the memory device, based on a position of the first memory cell in the first address.

19 Claims, 12 Drawing Sheets

(56) References Cited

U.S. PATENT DOCUMENTS

2014/0185377 A1\* 7/2014 Kim ................. G11C 16/26
                                              365/185.03
2017/0038807 A1   2/2017 Bittlestone et al.
2018/0076957 A1   3/2018 Watanabe et al.
2018/0176012 A1   6/2018 Hung et al.

\* cited by examiner

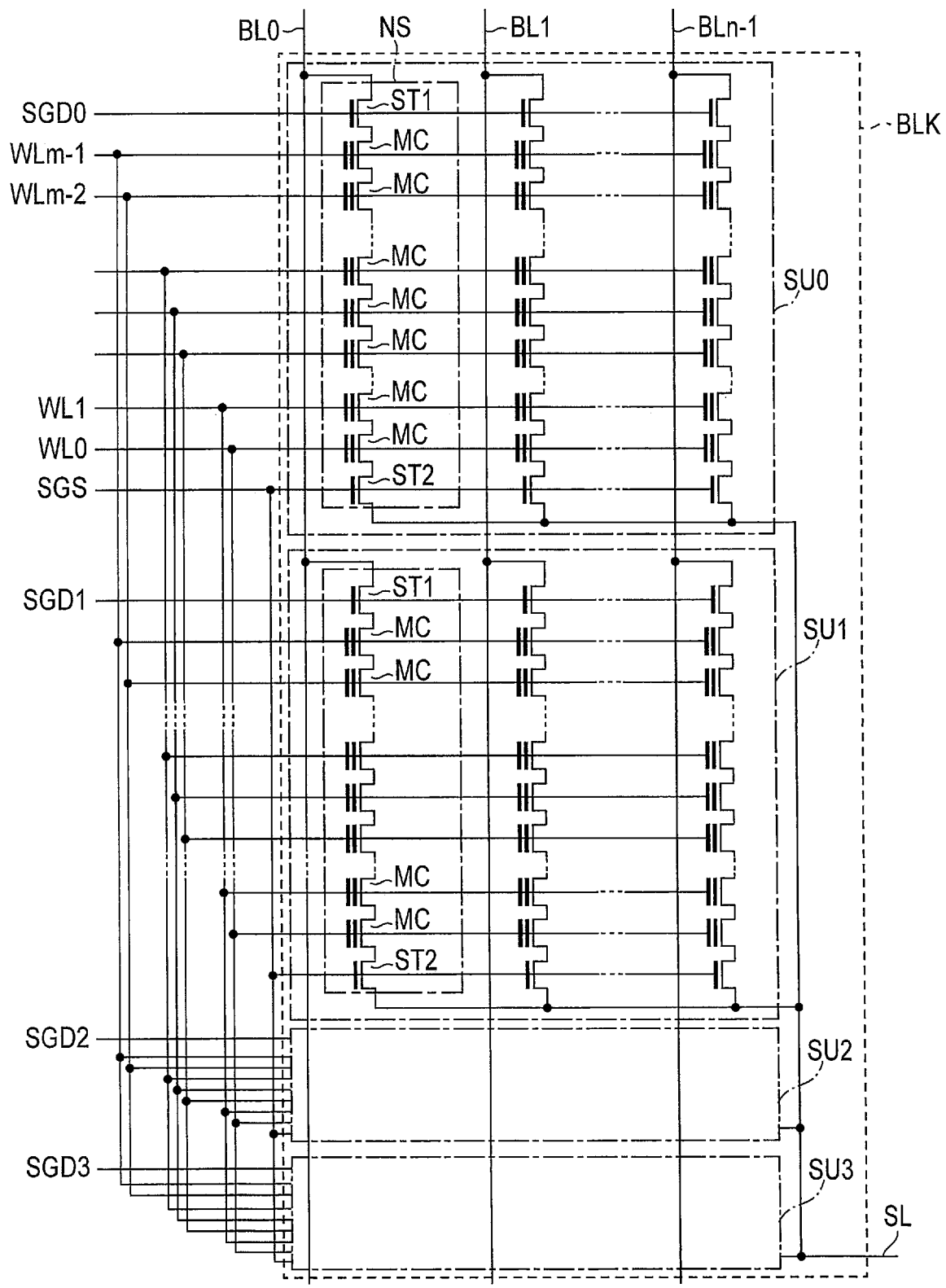
F I G. 3

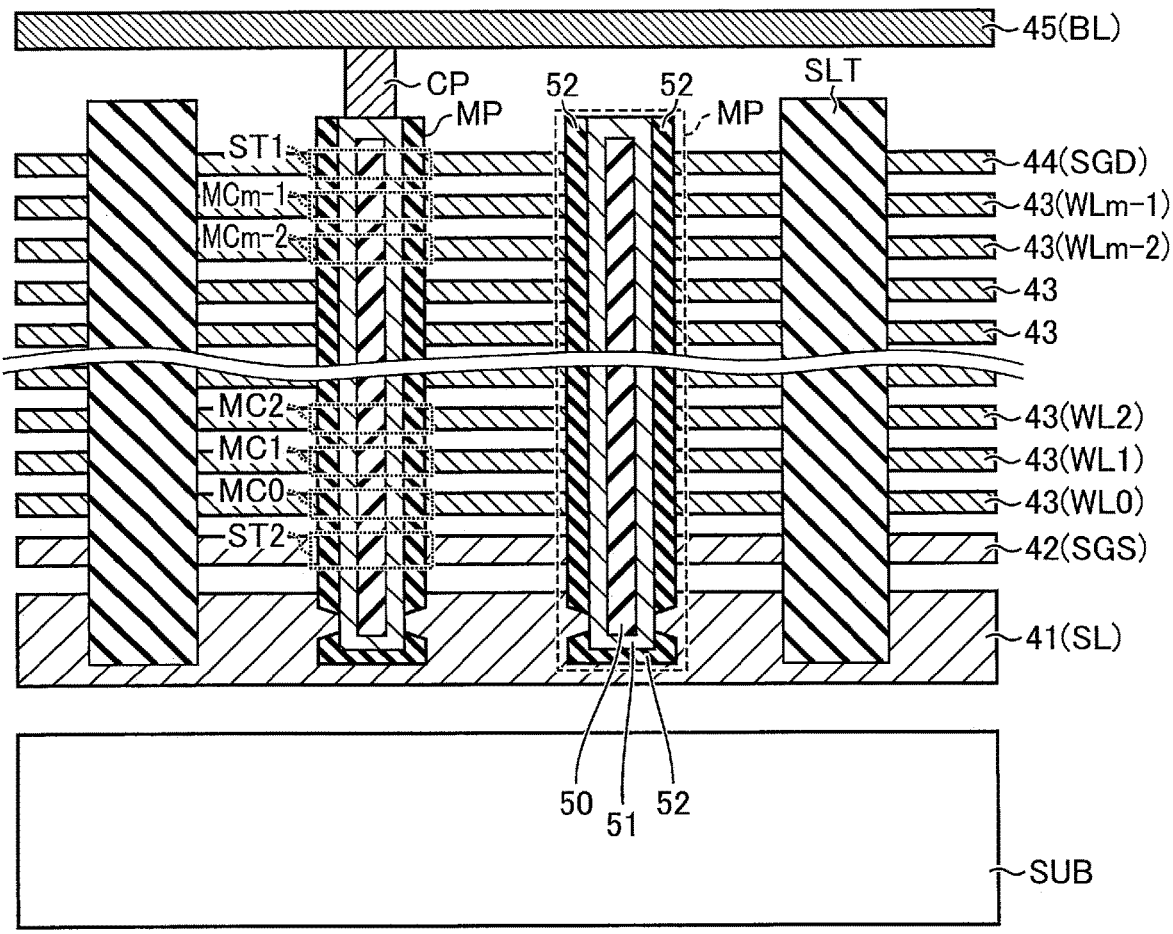
F I G. 4

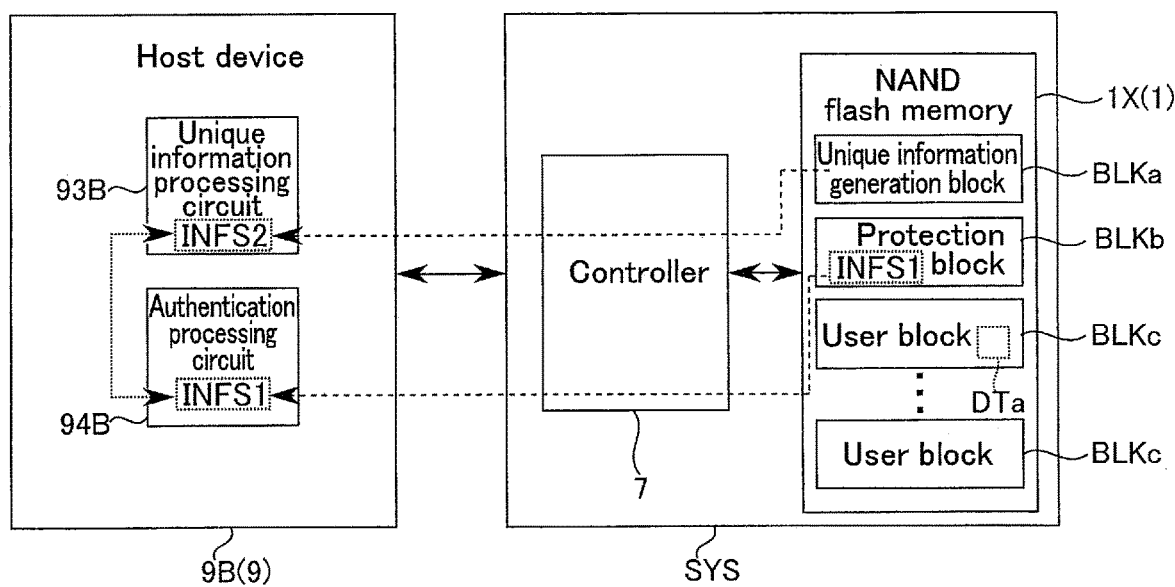
F I G. 11

MEMORY SYSTEM, MEMORY DEVICE, AND CONTROL METHOD OF MEMORY SYSTEM FOR GENERATING INFORMATION FROM A THRESHOLD VOLTAGE

CROSS-REFERENCE TO RELATED APPLICATIONS

This application is based upon and claims the benefit of priority from Japanese Patent Application No. 2020-060809, filed Mar. 30, 2020, the entire contents of which are incorporated herein by reference.

FIELD

Embodiments described herein relate generally to a memory system, a memory device, and a control method of the memory system.

BACKGROUND

Research and development of various technologies for preventing unlawful use of contents has been promoted.

BRIEF DESCRIPTION OF THE DRAWINGS

FIG. 3 is an equivalent circuit diagram illustrating a configuration example of a memory cell array according to the embodiment.

FIG. 4 is a schematic cross-sectional view illustrating a structure example of a memory cell array according to the embodiment.

FIG. 9, FIG. 10 and FIG. 11 are schematic views for explaining an operation example of the memory system of the embodiment.

DETAILED DESCRIPTION

In general, according to one embodiment, a memory system includes: a memory device configured to store data; and a controller configured to control an operation for the memory device. The memory device is configured to: execute a program operation by a first program voltage on a plurality of memory cells belonging to a first address of the memory device; detect at least one first memory cell among the plurality of memory cells by using a first determination level and a second determination level different from the first determination level, the at least one first memory cell having a threshold voltage of a value different from a value between the first determination level and the second determination level; and generate unique information of the memory device, based on a position of the first memory cell in the first address.

Hereinafter, referring to the accompanying drawings, embodiments will be described in detail. In the description below, elements having the same function and structure are denoted by the same reference sign.

In addition, in each embodiment below, when constituent elements (e.g. word lines WL, bit lines BL, and various voltages and signals), which are denoted by reference signs ending with numerals/alphabetical characters for distinction, do not need to be distinguished, expressions (reference signs) without such numerals/alphabetical characters at the ends are used.

[Embodiments]

Referring to FIG. 1 to FIG. 13, a memory system, a memory device, and a control method of the memory system according to embodiments will be described.

(a) Configuration Example

Referring to FIG. 1 to FIG. 6, a configuration example of the memory system of the present embodiment will be described.

Figure 1:
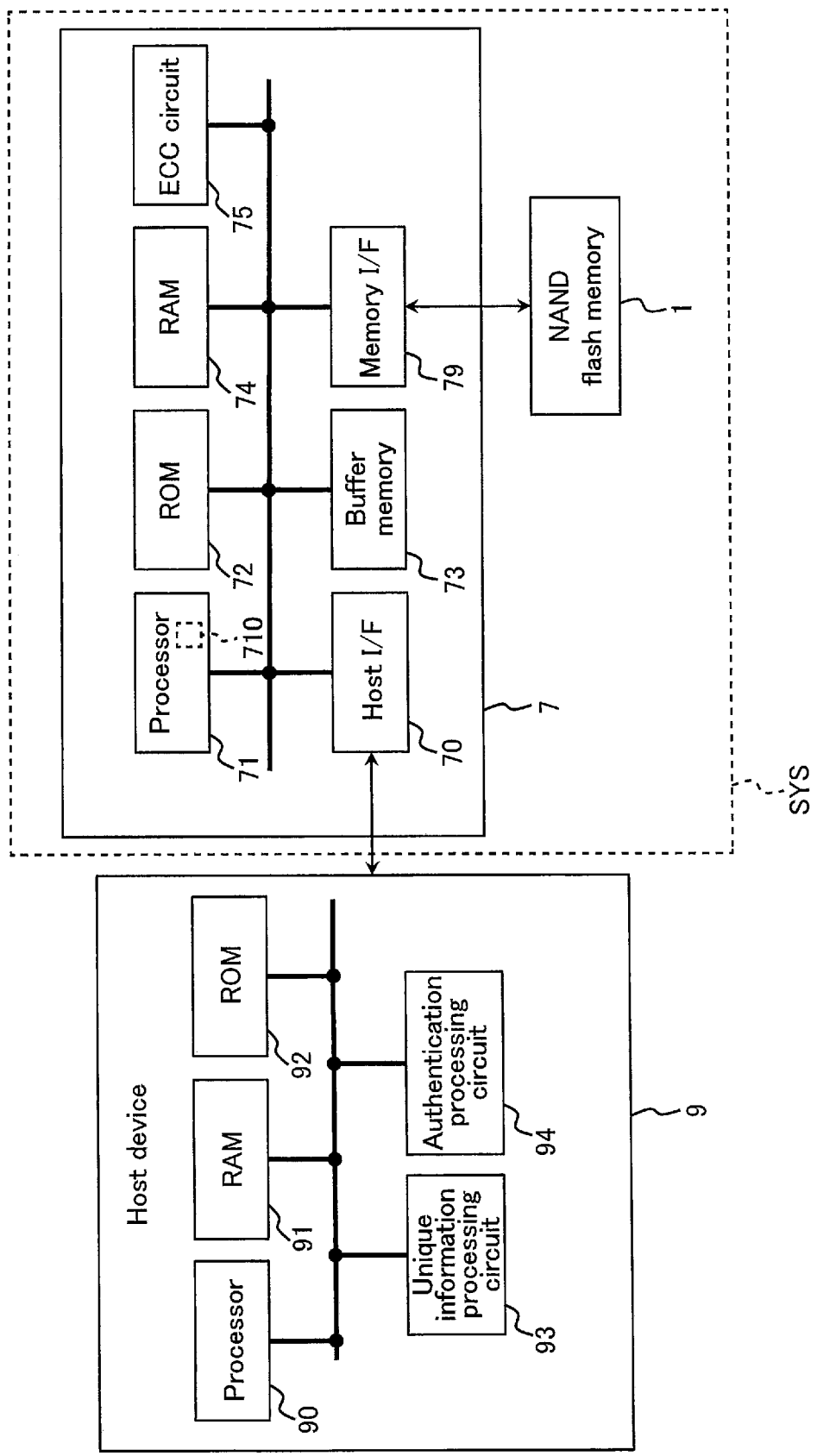
FIG. 1 is a view illustrating a configuration example of a memory system of an embodiment.

FIG. 1 is a block diagram illustrating a configuration example of the memory system of the embodiment.

A memory system SYS of the embodiment is electrically connected to a host device 9.

The memory system SYS performs data transfer, data storage, and the like, according to a command (hereinafter referred to as "host command") from the host device 9.

The memory system SYS of the present embodiment includes at least one NAND flash memory 1, and a controller 7. The NAND flash memory 1 is an example of the memory device.

The controller (also referred to as "memory controller") 7 orders write (write operation) of data to the NAND flash memory 1, read (read operation) of data from the NAND flash memory 1, and erase (erase operation) of data in the NAND flash memory 1, in accordance with host commands. The controller 7 manages data in the NAND flash memory 1.

An internal configuration of the controller 7 will be described later.

The NAND flash memory 1 is a nonvolatile semiconductor memory device which stores data substantially nonvolatilely. Hereinafter, the NAND flash memory 1 will also be referred to simply as "flash memory".

(a-1) Configuration Example of the Memory Device

Figure 2:
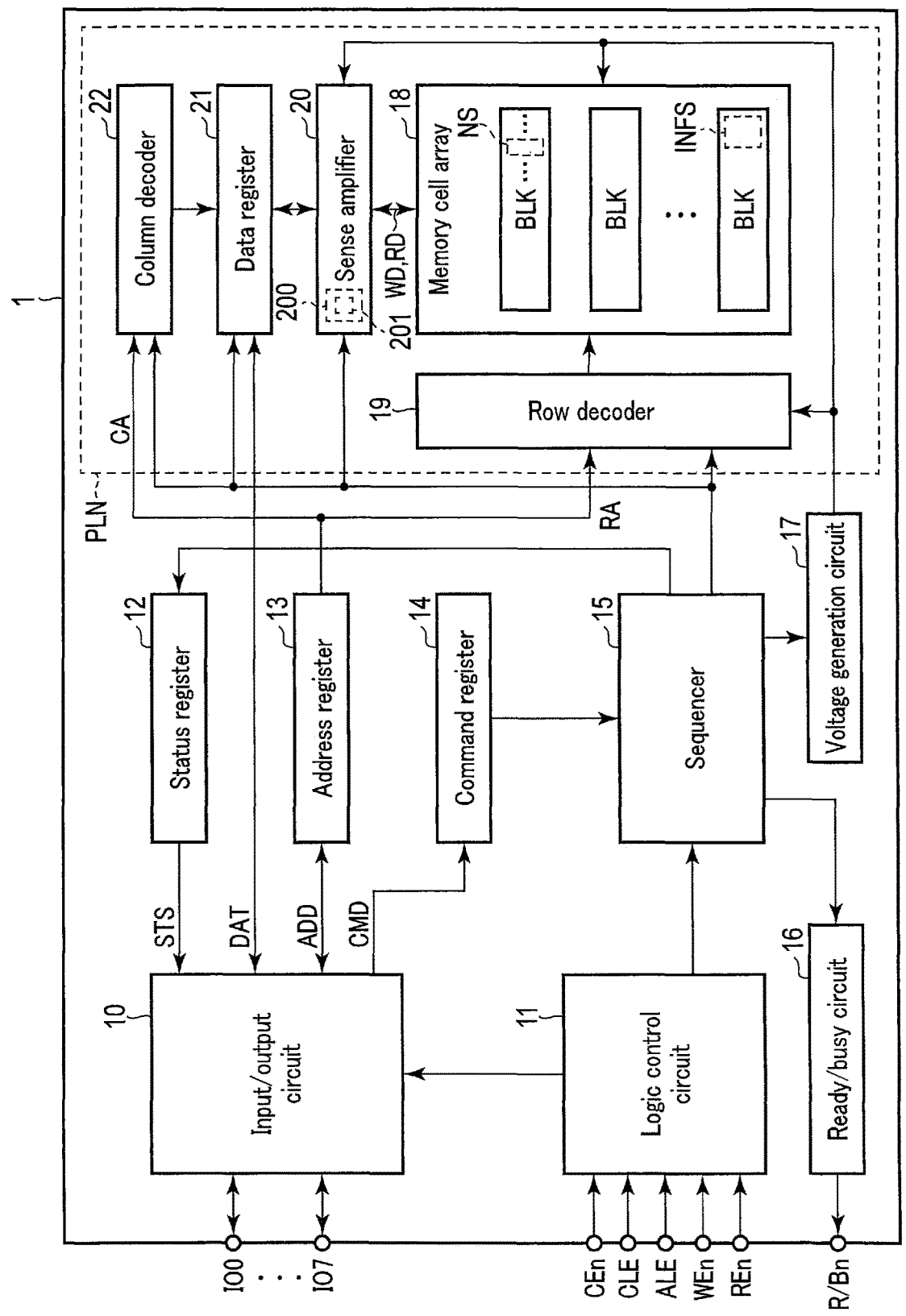
FIG. 2 is a view illustrating a configuration example of a NAND flash memory according to the embodiment.

FIG. 2 is a block diagram illustrating a configuration example of the flash memory in the memory system of the present embodiment.

As illustrated in FIG. 2, the flash memory 1 includes an input and output (input/output) circuit 10, a logic control circuit 11, a status register 12, an address register 13, a command register 14, a sequencer 15, a ready and busy (ready/busy) circuit 16, a voltage generation circuit 17, a memory cell array 18, a row decoder 19, a sense amplifier 20, a data register 21, and a column decoder 22.

The input/output circuit 10 controls the input and output of signals 10 (100 to 107).

The input/output circuit 10 sends data (write data) DAT from the memory controller 7 to the data register 21. The input/output circuit 10 sends an address ADD from the controller 7 to the address register 13. The input/output circuit 10 sends a command (hereinafter, also referred to as "controller command") CMD from the controller 7 to the command register 14. The input/output circuit 10 sends status information STS from the status register 12 to the memory controller 7. The input/output circuit 10 sends data (read data) DAT from the data register 21 to the memory controller 7.

The logic control circuit 11 receives, from the controller 7, a chip enable signal CEn, a command latch enable signal CLE, an address latch enable signal ALE, a write enable signal Wen, and a read enable signal REn. The logic control circuit 11 controls the input/output circuit 10 and sequencer 15 according to the received signals.

The status register 12 temporarily stores status information, for example, of data write, data read, and data erase. By acquiring the status information, the controller 7 determines whether the operations are normally completed or not.

The address register 13 temporarily stores the address ADD which is received from the memory controller 7 via the input/output circuit 10. The address register 13 transfers a row address RA to the row decoder 19, and transfers a column address CA to the column decoder 22.

The command register 14 temporarily stores the controller command CMD which is received via the input/output circuit 10. The command register 14 transfers the controller command CMD to the sequencer 15.

The sequencer 15 controls the operation of the entirety of the memory device 1. The sequencer 15 controls, according to the controller command CMD, for example, the status register 12, the ready/busy circuit 16, the voltage generation circuit 17, the row decoder 19, the sense amplifier 20, the data register 21, and the column decoder 22. Thereby, the sequencer 15 executes a write operation, a read operation, and an erase operation.

The ready/busy circuit 16 controls a signal level of a ready/busy signal R/Bn according to the operation state of the memory device 1. The ready/busy circuit 16 sends the ready/busy signal R/Bn to the controller 7.

The voltage generation circuit 17 generates voltages for use in the write operation, read operation, and erase operation according to the control of the sequencer 15. The voltage generation circuit 17 supplies the generated voltages to, for example, the memory cell array 18, the row decoder 19, and the sense amplifier 20. The row decoder 19 and sense amplifier 20 apply the voltages, which are supplied from the voltage generation circuit 17, to memory cells in the memory cell array 18.

The memory cell array 18 includes a plurality of blocks (physical blocks) BLK. Each block BLK includes memory cells (hereinafter, also referred to as "memory cell transistors") which are associated with rows and columns.

The row decoder 19 decodes the row address RA. Based on the decoded result, the row decoder 19 controls activation or deactivation (selection or non-selection) of the blocks BLK, word lines, and the like. The row decoder 19 applies voltages for the write operation, read operation, and erase operation to the memory cell array 18 (block BLK).

The sense amplifier (sense amplifier module) 20 senses a signal which is output from the memory cell array 18 at a time of the read operation. Based on the sensed signal, data is determined. This data is used as read data. The sense amplifier 20 sends the read data to the data register 21. At a time of the write operation, the sense amplifier 20 controls, based on write data, potentials of the bit lines BL of the memory cell array 18.

For example, the sense amplifier 20 includes a plurality of sense amplifier circuits 200. One sense amplifier circuit 200 is connected to one or more corresponding bit lines. Each sense amplifier circuit 200 includes at least one latch circuit 201. At a time of the read operation, the latch circuit 201 temporarily stores signals corresponding to threshold voltages of memory cells, which are output from a NAND string in the memory cell array 18.

The data register 21 stores write data and read data. In the write operation, the data register 21 transfers the write data DAT, which is received from the input/output circuit 10, to the sense amplifier 20 as write data WD. In the read operation, the data register 21 transfers the read data RD, which is received from the sense amplifier 20, to the input/output circuit 10 as read data DAT.

The column decoder 22 decodes the column address CA. The column decoder 22 controls the sense amplifier 20 and data register 21 according to the decoded result.

FIG. 3 is a schematic circuit diagram illustrating an example of a configuration of the memory cell array in the flash memory of the present embodiment.

As illustrated in FIG. 3, in the memory cell array 18, one block ELK includes, for example, four string units SU (SU0 to SU3). Each string unit SU includes a plurality of NAND strings NS. Each NAND string NS includes, for example, a plurality of memory cells MC (for example, an m-number of memory cells MC), and two select transistors ST1 and ST2. Symbol m is an integer of 1 or more. The number of select transistors ST1 and ST2 in the NAND string NS is freely selected, and it suffices that at least one select transistor ST1 and at least one select transistor ST2 are provided.

The memory cell MC includes a control gate and a charge storage layer. Thereby, the memory cell MC stores data nonvolatilely. The memory cell MC may be a charge trap type which uses an insulating layer (e.g. a silicon nitride film) as the charge storage layer, or may be a floating-gate type which uses a conductive layer (e.g. a silicon film) as the charge storage layer.

The memory cells MC are connected in series between a source of the select transistor ST1 and a drain of the select transistor ST2. Current paths of the memory cells MC are connected in series between the two select transistors ST1 and ST2. A terminal (e.g. a drain) of the current path of a memory cell MC, which is located most on the drain side (i.e. the select transistor ST1 side) in the NAND string NS, is connected to the source of the select transistor ST1. A terminal (e.g. a source) of the current path of a memory cell MC, which is located most on the source side (i.e. the select transistor ST2 side) in the NAND string NS, is connected to the drain of the select transistor ST2.

In each of the string units SU0 to SU3, the gate of the select transistor ST1 is connected to a corresponding one of drain-side select gate lines SGD0 to SGD3. In each of the string units SU0 to SU3, the gates of the select transistors ST2 are commonly connected to one source-side select gate line SGS. Note that select gate lines SGS, which are independent from each other, may be connected to the string units SU0 to SU3, respectively.

The control gate of each memory cell MC in the block BLK is connected to a corresponding one of word lines WL0 to WLm−1.

The drains of the select transistors ST1 of the respective NAND strings NS in the string unit SU are connected to different bit lines BL0 to BLn−1, respectively. Symbol n is an integer of 1 or more. Each bit line BL is commonly connected to one NAND string NS in each string unit SU over plural blocks BLK.

The sources of the select transistors ST2 are commonly connected to a source line SL. For example, the string units SU in the block BLK are connected to a common source line SL.

The string unit SU is a set of NAND strings NS which are connected to plural bit lines BL and connected to an identical select gate line SGD. The block BLK is a set of string units SU which are commonly connected to plural word lines WL. The memory cell array 18 is a set of blocks BLK having common bit lines BL.

Data write and data read are executed batchwise to memory cells MC connected to any one of word lines WL in a selected one of the string units SU. In the description below, a group of memory cells MC, which are selected batchwise when data write and data read are executed, are referred to as "memory cell group". A set of 1-bit data, which is written in the memory cells MC included in one memory cell group or is read from the memory cells MC included in one memory cell group, is referred to as "page". One or more pages are allocated to one memory cell group.

Data erase is executed in units of the block BLK. However, data erase may be executed by a unit smaller than the block BLK.

Note that there is a case in which the flash memory 1 includes a unit of control, which is called "plane PLN". One plane PLN includes, for example, the memory cell array 18, the row decoder 19, the sense amplifier 20, the data register 21, and the column decoder 22. In the example of the flash memory 1 illustrated in FIG. 2, only one plane PLN is illustrated. The flash memory 1 may include two or more planes PLN. When the flash memory 1 includes planes PLN, the respective planes PLN can execute different operations at different timings by the control of the sequencer 15.

FIG. 4 is a cross-sectional view illustrating an example of a cross-sectional structure of the memory cell array of the flash memory of the present embodiment.

As illustrated in FIG. 4, the memory cell array 18 is provided above a semiconductor substrate SUB in the Z direction via an interlayer insulating film (not shown). The memory cell array 18 includes, for example, a plurality of conductive layers 41 to 45, and a plurality of memory pillars MP.

The conductive layer 41 is provided above the semiconductor substrate SUB in the Z direction. For example, the conductive layer 41 has a plate shape extending along an XY plane that is parallel to a surface of the semiconductor substrate SUB. The conductive layer 41 is used as a source line SL of the memory cell array 18. The conductive layer 41 includes, for example, silicon (Si).

The conductive layer 42 is provided above the conductive layer 41 in the Z direction via an insulating layer (not shown). For example, the conductive layer 42 has a plate shape extending along the XY plane. The conductive layer 42 is used as a select gate line SGS. The conductive layer 42 includes, for example, silicon (Si).

Insulating layers (not shown) and the conductive layers 43 are alternately stacked in the Z direction above the conductive layer 42. For example, each of the conductive layers 43 has a plate shape extending along the XY plane. The stacked conductive layers 43 are used as word lines WL0 to WLm−1 in the order from the semiconductor substrate SUB side. The conductive layers 43 include, for example, tungsten (W).

The conductive layer 44 is provided via an insulating layer (not shown) above the uppermost conductive layer 43 of the stacked conductive layers 43. The conductive layer 44 has a plate shape extending along the XY plane. The conductive layer 44 is used as a select gate line SGD. The conductive layer 44 includes, for example, tungsten (W).

The conductive layer 45 is provided via an insulating layer (not shown) above the conductive layer 44 in the Z direction. For example, the conductive layer 45 has a line shape extending along the Y direction. The conductive layer 45 is used as a bit line BL. As described above, a plurality of conductive layers 45 functioning as bit lines BL are arranged in the X direction. The conductive layers 45 include, for example, copper (Cu).

The memory pillar MP has a columnar structure extending in the Z direction. The memory pillar MP penetrates, for example, the conductive layers 42 to 44. An upper end of the memory pillar MP is provided, for example, between a region (position/height in the Z direction) where the conductive layer 44 is provided, and a region (position/height in the Z direction) where the conductive layer 45 is provided. A lower end of the memory pillar MP is provided, for example, in a region where the conductive layer 41 is provided.

The memory pillar MP includes, for example, a core layer 50, a semiconductor layer 51, and a stacked film 52.

The core layer 50 has a columnar structure extending in the Z direction. An upper end of the core layer 50 is provided, for example, in a region above the region (position/height) where the conductive layer 44 is provided. A lower end of the core layer 50 is provided, for example, in the region where the conductive layer 41 is provided. The core layer 50 includes, for example, an insulator such as silicon oxide ($SiO_2$).

The semiconductor layer 51 covers the core layer 50. The semiconductor layer 51 is put in direct contact with the conductive layer 41, for example, on a side surface (a surface substantially perpendicular to the XY plane) of the memory pillar MP. The semiconductor layer 51 includes, for example, silicon (Si).

The stacked film 52 covers the side surface and bottom surface of the semiconductor layer 51, except the part where the conductor layer 41 and semiconductor layer 51 are put in contact. The stacked film 52 includes a tunnel insulating layer, a charge storage layer, and a block insulting layer. The charge storage layer is provided between the tunnel insulating layer and the block insulating layer. The tunnel insulating layer is provided between the charge storage layer and the semiconductor layer 51. The block insulating layer is provided between the charge storage layer and the conductive layers 43, between the charge storage layer and the conductive layer 42, and between the charge storage layer and the conductive layer 44.

In the flash memory 1, the characteristics of the memory cells MC are not uniform in the memory cell array 18, depending on the positions in the Z direction in the memory cell array 18, the positions in the X-Y plane in the memory cell array 18, the film thickness of the stacked film 52 (tunnel insulating layer, charge storage layer, and block insulating layer), and the dimensions of the memory cells MC.

<Relationship between Data and Threshold Voltages of Memory Cells>

Figure 5:
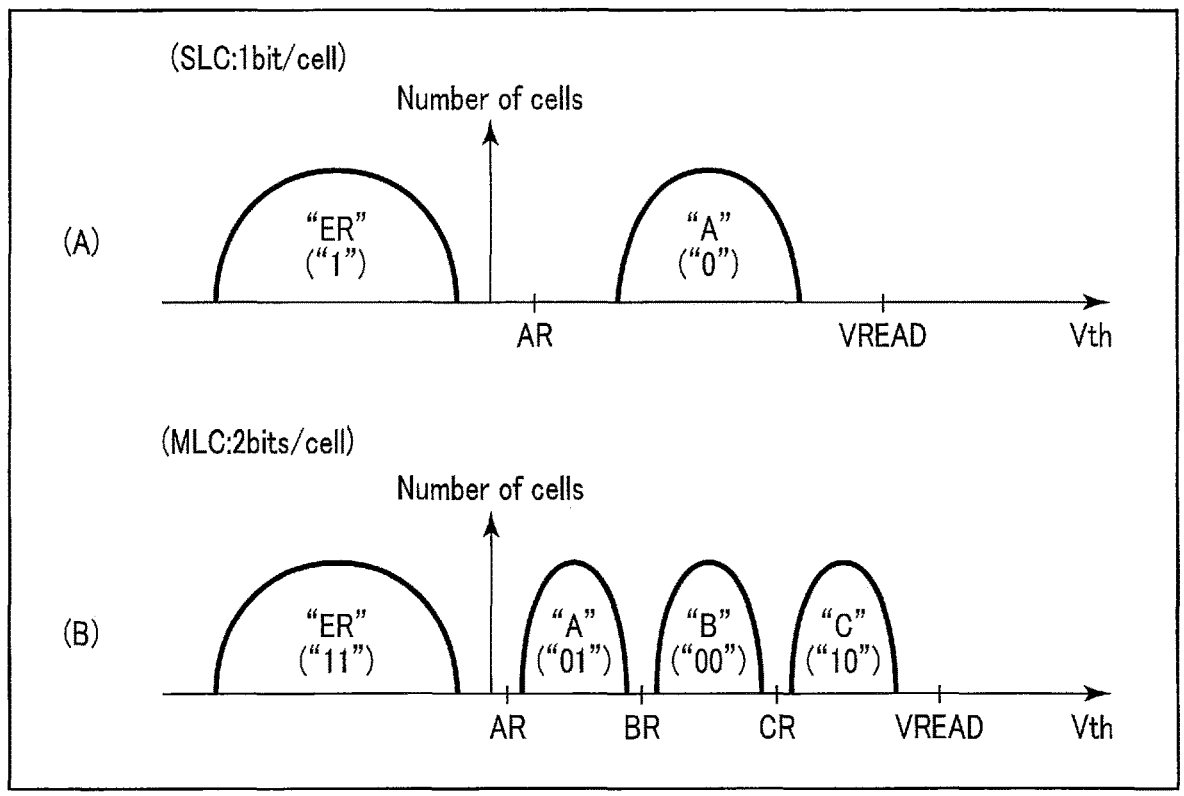
FIG. 5 is a view illustrating a relationship between data and a distribution of threshold voltages of memory cells according to the embodiment.

FIG. 5 is a view illustrating a relationship between data and distributions of threshold voltages of memory cells in a flash memory.

FIG. 5 illustrates a relationship between distributions of threshold voltages of memory cells and a read voltage. In FIG. 5, the ordinate axis corresponds to the number of memory cells, and the abscissa axis corresponds to threshold voltages Vth of memory cells.

In other words, FIG. 5 represents distributions of threshold voltages corresponding to data which one memory cell stores. Hereinafter, as examples of write methods, an SLC (Single Level Cell) method in which 1-bit data is stored in one memory cell, and an MLC (Multi Level Cell) method in which 2-bit data is stored in one memory cell MC, will be described.

As illustrated in part (A) of FIG. 5, in the case of the SLC method, two threshold voltages are set for the memory cell MC. The two threshold voltages are referred to as an "ER" level (or "ER" state) and an "A" level (or "A" state) in the order from the lower voltage value side. In the SLC method, for example, "1" data is allocated to the "ER" level, and "0" data is allocated to the "A" level.

As illustrated in part (B) of FIG. 5, in the case of the MLC method, four threshold voltages are set for the memory cell MC. The four threshold voltages are referred to as an "ER" level, an "A" level, a "B" level (or "B" state) and a "C" level (or "C" state) in the order from the lower voltage value side. In the MLC method, for example, "11 (Lower/Upper)" data, "01" data, "00" data, and "10" data are allocated to the "ER" level, "A" level, "B" level, and "C" level, respectively.

As described above, the characteristics of the memory cells are not uniform in the memory cell array. Therefore, the threshold voltages of memory cells allocated to each level have a certain distribution (threshold voltage distribution).

In the threshold voltage distributions of parts (A) and (B) of FIG. 5, read voltages (read levels) are set between neighboring threshold voltage distributions.

For example, the read voltage AR is set between a maximum threshold voltage in the distribution of the "ER" level and a minimum threshold voltage in the distribution of the "A" level. The read voltage AR is used in an operation of determining whether the threshold voltage of the memory cell MC is included in the threshold voltage distribution of the "ER" level or in the threshold voltage distribution of the "A" level or a higher level. When the read voltage AR is applied to the memory cells MC, the memory cells corresponding to the "ER" level are set in the ON state, and the memory cells corresponding to the "A" level, "B" level, and "C" level are set in the OFF state.

The read voltage BR is set between the threshold voltage distribution of the "A" level and the threshold voltage distribution of the "B" level, and the read voltage CR is set between the threshold voltage distribution of the "B" level and the threshold voltage distribution of the "C" level. When the read voltage BR is applied to the memory cells MC, the memory cells corresponding to the "ER" level and "A" level are set in the ON state, and the memory cells corresponding to the "B" level and "C" level are set in the OFF state. When the read voltage CR is applied to the memory cells MC, the memory cells corresponding to the "ER" level, "A" level, and "B" level are set in the ON state, and the memory cells corresponding to the "C" level are set in the OFF state.

As a voltage which is applied to a non-selected word line at a time of a read operation, a read pass voltage (non-select voltage) VREAD is set. The voltage value of the read pass voltage VREAD is higher than the maximum threshold voltage in the highest threshold voltage distribution. The memory cells MC having the gates, to which the read pass voltage VREAD is applied, are set in the ON state, regardless of the data that the memory cells MC store.

Note that the above-described number of bits of data stored in one memory cell MC, and the allocation of data to the threshold voltages of the memory cell MC, are merely examples. For example, data of 3 or more bits may be stored in one memory cell MC. Data different from the above may be allocated to each threshold voltage.

The respective read voltages and the read pass voltage VREAD may be set to identical voltage values between the respective methods, or may be set to different voltage values between the methods.

In this manner, by the voltage of a certain voltage value being applied to the memory cell, the ON or OFF of the memory cell is detected. As a result, the threshold voltage of the memory cell is determined.

FIG. 2 to FIG. 4 illustrate merely examples of the circuit configuration of the memory cell array of the flash memory in the present embodiment, and the circuit configuration of the memory cell array is not limited to the examples of FIG. 2 to FIG. 4.

(a-2) Configuration Example of the Controller

As illustrated in FIG. 1, the controller 7 includes a host interface circuit 70, a processor (CPU) 71, a ROM 72, a buffer memory 73, a RAM 74, an ECC circuit 75, and a memory interface circuit 79.

Note that the functions of the controller 7, which will be described later, may be implemented by firmware or by hardware.

The controller 7 may be constituted by, for example, a SoC (System on a chip).

The processor 71 controls the operation of the entirety of the controller 7.

For example, responding to a request (host command) from the host device 9, the processor 71 generates a controller command. The processor 71 sends the generated controller command to the memory interface circuit 79.

The processor 71 can control execution of various internal processes for managing the flash memory 1, such as wear leveling, garbage collection, and refresh. In these controls, too, the processor 71 generates controller commands and sends the controller commands to the memory interface circuit 79. Based on criteria of the processor 71, the controller 7 can order the flash memory 1 to execute, for example, an erase operation at a time of executing an internal process.

For example, in the present embodiment, the processor 71 includes a unique information generation circuit 710. The unique information generation circuit 710 executes various processes for generating unique information (to be described later) in the memory system SYS (flash memory 1) of the present embodiment. Note that the function of the unique information generation circuit 710 may be implemented as software or firmware as the function of the processor 71. The unique information generation circuit 710 may be provided in the controller 7 as different hardware from the processor 71. The unique information generation circuit 710 may be provided in the flash memory 1.

The ROM 72 stores a control program (firmware) of the memory system SYS, pieces of setting information, and the like.

The buffer memory 73 temporarily stores data from the host device 9 and data from the flash memory 1 when data is transferred between the memory system SYS and the host device 9. In addition, the buffer memory 73 temporarily stores data which is generated in the controller 7. For example, the buffer memory 73 is an SDRAM (Synchronous Dynamic random access memory) or an SRAM (Static random access memory). The buffer memory 73 may be provided outside the controller 7.

The RAM 74 is a memory area which is used as a working area of the processor 71. The RAM 74 is, for example, an SRAM or an SDRAM. The RAM 74 may be provided outside the controller 7.

For example, parameters for managing the flash memory 1, various management tables and the like are loaded from the flash memory 1 into the RAM 74. The RAM 74 stores, for example, an address conversion table. The address conversion table is a table representing a correspondence relationship between logical addresses which are storage positions of data that the host device 9 designates, and physical addresses which are storage positions of data that is actually written to the flash memory 1. The address conversion table is stored, for example, in the flash memory 1. The address conversion table is read from the flash memory 1 and loaded in the RAM 74, for example, when the memory system SYS is started, or when necessary.

The logical addresses are logical storage positions of data, which are obtained based on addresses designated from the host device 9. The physical addresses are physical storage positions of data in the flash memory 1. The address conversion table receives logical addresses as an input, and outputs physical addresses.

The ECC circuit 75 executes error detection and error correction in read data. Hereinafter, the error detection and error correction, which are executed by the ECC circuit 75, are referred to as "ECC process". At a time of data write, the ECC circuit 75 generates a parity and a correction code, based on data from the host device 9. The data, parity and correction code are written to the flash memory 1. At a time of data read, the ECC circuit 75 generates a syndrome, based on the read data, parity and correction code, and judges the presence or absence of an error in the read data. When an error is included in the data, the ECC circuit 75 specifies the position of the error in the data, and corrects the error.

The host interface circuit 70 is connected to the host device 9 via wireless communication or wired communication. The host interface circuit 70 executes communication between the memory system SYS and the host device 9. For example, the host interface circuit 70 controls transfer of data, host commands, and responses between the memory system SYS and the host device 9. The host interface circuit 70 supports a communication interface standard such as SATA (Serial Advanced Technology Attachment), SAS (Serial Attached SCSI), PCIe (PCI Express) (trademark), or SD™ (trademark). The host device 9 is a computer or the like, which supports an interface such as SATA, SAS, or PCIe.

The memory interface circuit 79 is connected to the corresponding flash memory 1. A plurality of flash memories 1 may be connected to a single memory interface circuit 79. The memory interface circuit 79 executes communication between the controller 7 and the flash memory 1. The memory interface circuit 79 is constructed based on a NAND interface standard. A plurality of flash memories 1 may be controlled in parallel by the memory interface circuit 79 to which the flash memories 1 are connected.

The memory system SYS including the controller 7 and flash memory 1 is a memory card such as an SD™ card, an SSD (solid state drive), a UFS (Universal Flash Storage), or the like.

(a-3) Configuration Example of the Host Device

As illustrated in FIG. 1, the host device 9 is connected to the memory system SYS via an interface such as SATA, SAS, PCIe, or an SD card.

Various processes, such as data transfer, are executed between the host device 9 and the system SYS.

The host device 9 includes a processor 90, a RAM (memory area) 91, a ROM 92, a unique information processing circuit 93, and an authentication processing circuit 94.

The processor 90 controls the operation of the entirety of the host deice 9.

The processor 90 executes various processes of the host device 9, by executing various programs (e.g. an access program AP). When the processor 90 orders the memory system SYS to execute data write, data read, or data erase, the processor 90 sends a host command to the memory system SYS.

The RAM 91 is a memory area which is used as a working area of the processor 90. The RAM 91 is, for example, an SRAM or an SDRAM.

The ROM 92 stores a control program (firmware) of the host device 9, and pieces of setting information.

The host device 9 stores an access program AP in the RAM 91 or ROM 92. The access program AP is executed on the processor 90. The access program AP executes various processes on specific data (e.g. content data) in the flash memory.

The host device 9 can access the memory system SYS by the access program AP. The host device 9 can request write of certain data to the flash memory 1 in the memory system SYS. The host device 9 can request read of certain data from the flash memory 1 of the memory system SYS. The host device 9 can request erase of certain data in the flash memory.

There is a case in which the host device 9 executes an authentication process using various pieces of information, when executing data write, data read, or data erase for the flash memory 1 by the access program. AP.

When authentication was successfully executed, the access (data write, read, or erase) to the flash memory 1 from the host device 9 is permitted. When authentication failed, the access to the flash memory 1 from the host device 9 is prohibited.

In the present embodiment, by using the unique information processing circuit 93, the host device 9 executes a process using the unique information of the memory system SYS, for the purpose of the authentication process between the host device 9 and the memory system SYS (flash memory 1). The unique information is information for the host device 9 to specify the memory system SYS.

In the present embodiment, the host device 9 executes the authentication process with the use of the generated unique information, by using the authentication processing circuit 94. The authentication process is a process for the host device 9 to authenticate the connected memory system SYS.

The unique information processing circuit 93 executes various processes using the unique information of the memory system SYS. The unique information processing circuit 93 generates unique information INFS1 of the memory system SYS (or flash memory 1) by using a certain area of the flash memory 1.

The unique information processing circuit 93 can control various operations for generating the unique information INFS1. For example, the generated unique information INFS1 is stored in a specific area (e.g. a block BLK) in the flash memory 1.

The authentication processing circuit 94 executes an authentication process between the host device 9 and the memory system SYS. The authentication processing circuit 94 can generate authentication information (e.g. an authentication key) by using the unique information INFS1 of the flash memory 1.

Note that the functions of the unique information processing circuit 93 and authentication processing circuit 94 may be implemented by software or firmware as the functions of the processor 71.

In addition, the unique information processing circuit 93 and authentication processing circuit 94 may be provided in the controller 7 in the memory system SYS. In this case, the host device 9 orders the unique information processing circuit 93 and authentication processing circuit 94 in the controller 7 to generate the unique information INFS1 and to authenticate the unique information.

(b) Operations

Referring to FIG. 6 to FIG. 12, operation examples of the memory system of the present embodiment will be described.

<Generation of Unique Information>

To begin with, referring to FIG. 6 to FIG. 10, a description will be given of various processes and operations for generating the unique information of the flash memory (memory system) in the memory system of the present embodiment. Hereinafter, the various processes are also referred to as "unique information generation process".

In the flash memory 1, a program voltage of a certain voltage value is applied to a certain word line, and thereby threshold voltages of memory cells connected to this word line WL increase.

Even if plural memory cells MC are connected to an identical word line WL, the values of the threshold voltages, which the memory cells can take, vary among the memory cells due to the variance in characteristics of the memory cells MC.

The variance in characteristics of the memory cells MC of each word line WL does not substantially change in each word line. Therefore, as regards memory cells connected to a certain word line, the relationship between the bit (digit), in which an error occurs in data including plural bits, and the position (column address, cell number) of the memory cell does not substantially change.

In the present embodiment, by making use of such characteristics/tendency of memory cells MC of the flash memory 1, the unique information of the flash memory 1 in the memory system SYS is generated.

An area for generating unique information (hereinafter referred to as "unique information generation area") is set in the flash memory 1.

Figure 6:
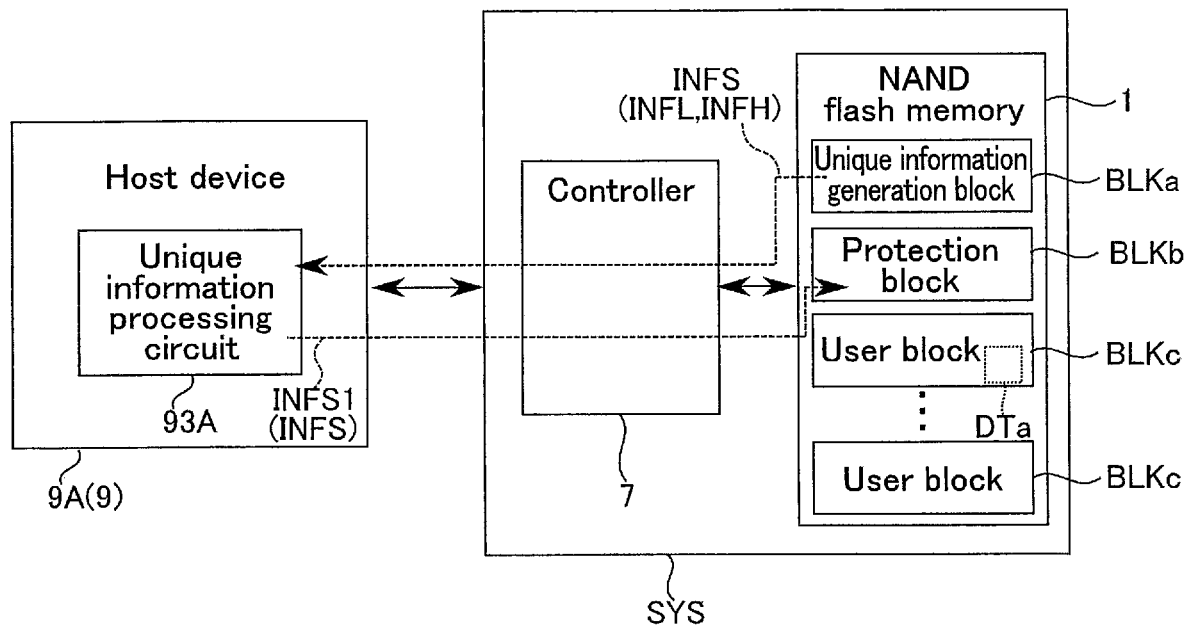
FIG. 6 and FIG. 7 are schematic views for explaining an operation example of the memory system of the embodiment.

FIG. 6 is a schematic view for describing a configuration example of the unique information generation area in the memory system of the embodiment. In FIG. 6, as an example of the host device 9, a host device 9A, which executes a process of generating unique information, is exemplarily illustrated.

The host device 9A includes a unique information processing circuit 93A. The flash memory 1, which is included in the memory system SYS, includes a unique information generation block BLKa, a protection block BLKb, and user blocks BLKc.

For example, among the blocks BLK included in the memory cell array 18 of the flash memory 1, a certain block BLKa is set as a unique information generation area (hereinafter, also referred to as "unique information generation block").

Figure 7:
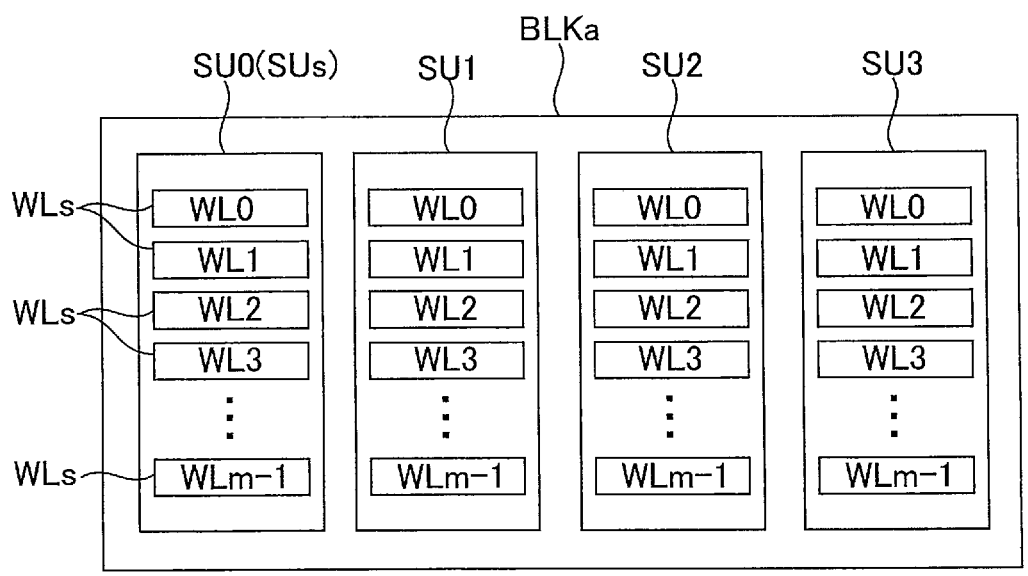

FIG. 7 is a schematic view illustrating a configuration example of the unique information generation block.

As illustrated in FIG. 7, the unique information generation block BLKa includes a plurality of (e.g. four) string units SU0, SU1, SU2 and SU3. Each string unit SU includes a plurality of word lines WL0 to WLm−1.

For example, unique information INFS of the flash memory 1 is generated by using memory cells MC which are connected to a certain word line WLs (here, any one of word lines WL0 to WLm−1) of a certain string unit SUs (here, string unit SU0) in the unique information generation block BLKa. The generated unique information INFS is provided to the host device 9A. However, plural string units and plural word lines may be used as a selected address, in accordance with the number of bits (data length) of the unique information INFS used for authentication.

Information relating to the address that is used for generating the unique information INFS is set, for example, as specifications or standards of the memory system SYS. The information relating to the address that was used for generating the unique information INFS may be stored as history information in an area in the memory system SYS, to which user access is restricted.

The generated unique information INFS is stored by the host device 9A in the protection area (hereinafter, also referred to as "protection block") BLKb in the flash memory 1. The protection block BLKb is an area to which user access is restricted.

In the memory cell area 18, a plurality of blocks (hereinafter referred to as "user blocks") BLKc, which are other than the unique information generation block BLKa and the protection block BLKb, are provided.

The user blocks BLKc store certain data (called "user data" or "normal data"). Using well-known art, write, read, and erase of data are executed for the user blocks BLKc. In the present embodiment, description is omitted of the write, read, and erase of data for the user blocks BLKc.

For example, content data may be stored in the user blocks BLKc.

The unique information processing circuit 93A included in the host device 9A illustrated in FIG. 6 executes various processes for generating the unique information INFS of the memory system SYS.

At the time of generating the unique information INFS, the unique information processing circuit 93A can control various processes and operations for at least one word line WLs (hereinafter referred to as "selected word line") of a certain string unit SUs in the unique information generation block BLKa.

For example, the unique information processing circuit 93A can instruct the flash memory 1 to execute a unique information generation process via the processor 90.

In the controller 7, the processor 71 (or unique information generation circuit 710) can order the flash memory 1 to execute the various processes/operations for the unique information generation process, based on the instruction from the host device 9A (unique information processing circuit 93A).

When the host device 9A writes data (e.g. secret information, content data, or the like), which is an object of protection, to the memory system SYS, the generation of the unique information INFS is executed.

The unique information processing circuit 93A included in the host device 9A executes the following processes at the time of generating the unique information INFS.

OPERATION EXAMPLES

Figure 8:
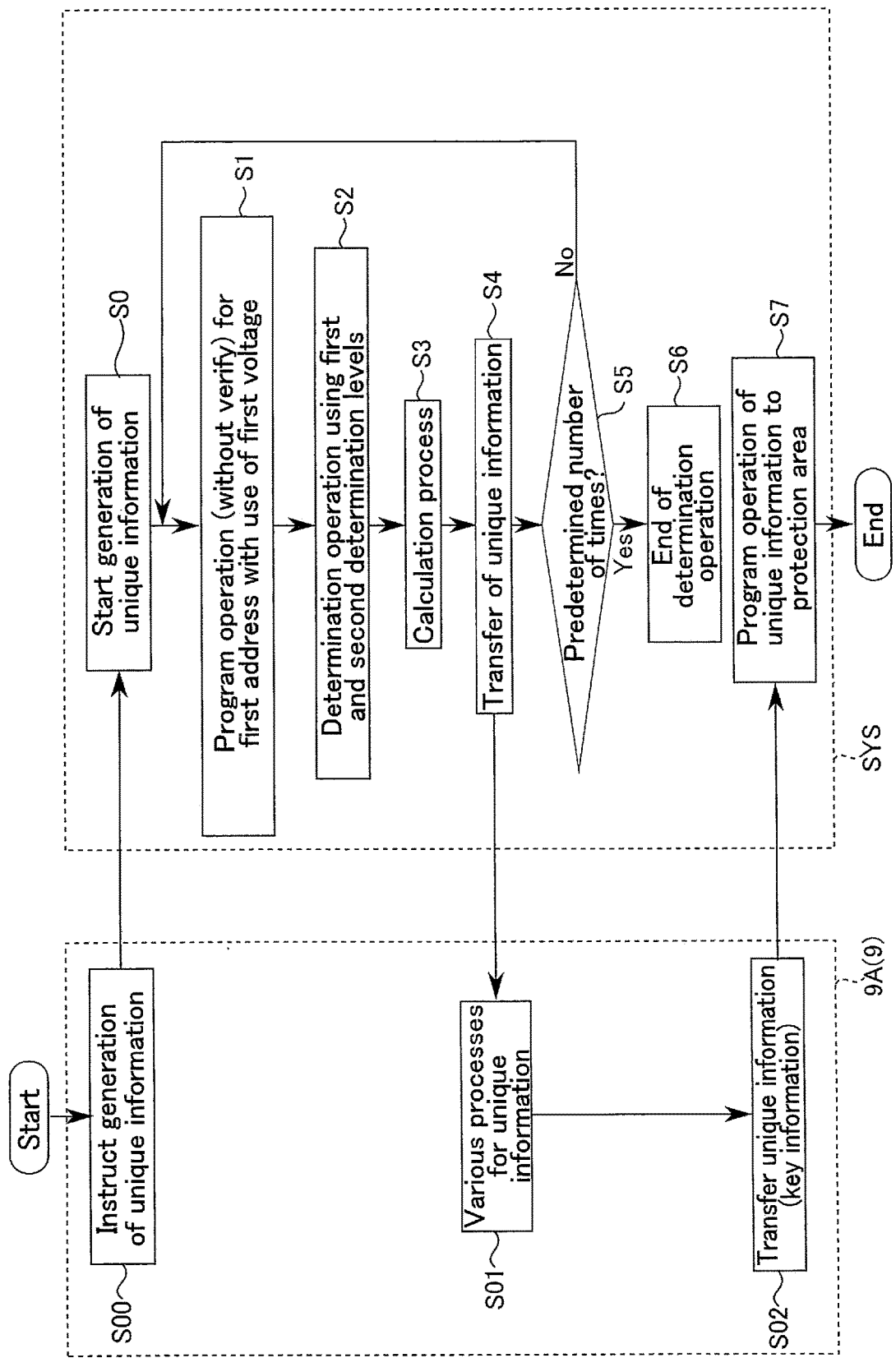
FIG. 8 is a flowchart illustrating an operation example of the memory system of the embodiment.

FIG. 8 is a flowchart of the unique information generation process in the memory system of the present embodiment.

<S00>

As illustrated in FIG. 8, in the host device 9A, the unique information processing circuit 93A instructs at a particular timing the memory system SYS to generate unique information. The host device 9A sends to the memory system SYS a host command for generating the unique information.

The generation of the unique information may be executed according to the specifications of the memory system SYS, for example, before shipment of the memory system SYS, at a time of starting the use of the memory system SYS, at a time of powering on the memory system SYS, or upon request by the user.

<S0>

The memory system SYS receives the instruction (host command) to generate the unique information from the host device 9A.

The controller 7 sends to the flash memory 1 various instructions (controller commands) for generating the unique information.

The flash memory 1 receives the instructions from the controller 7.

According to the instructions from the controller 7, the flash memory 1 starts the unique information generation process.

<S1>

In the flash memory 1, the sequencer 15 executes a program operation for the memory cells of a first address (e.g. word line WL0 of the string unit SU0) of the unique information generation block BLK.

In the present embodiment, the program operation for generating the unique information is different from an operation for writing specific data (e.g. user data).

In the present embodiment, the program operation at the time of the unique information generation is an operation of shifting the threshold voltage of the memory cell by applying a program voltage of a certain voltage value, without writing specific data. Hereinafter, the program operation at the time of the unique information generation is referred to as "rough program".

Figure 9:
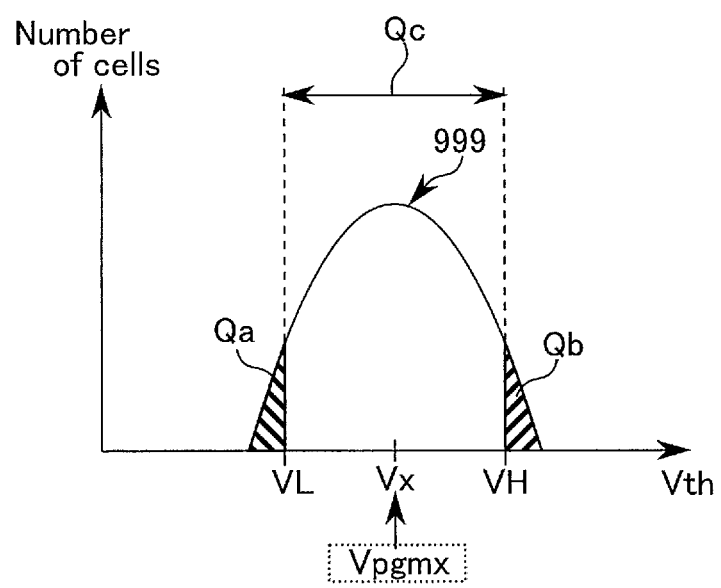

FIG. 9 is a schematic view for describing the rough program at the time of generating the unique information in the present embodiment.

For example, the rough program is executed on all memory cells in the unique information generation block BLKa. A program voltage Vpgmx is applied to the word lines WL sequentially or batchwise, in such a manner that the rough program is executed for all memory cells MC in the unique information generation block BLKa. In addition, the rough program may be executed to one word line WL in the unique information generation block BLKa. At this time, it suffices that the program voltage Vpgmx is applied to the one word line WL.

As illustrated in FIG. 9, by the execution of the rough program, the program voltage Vpgmx is applied to at least one word line WLs of the selected string unit SUs.

The threshold voltages of the memory cells MC connected to the selected word line WLs are distributed in a range in which a certain voltage value corresponding to the program voltage Vpgmx is a central value Vx. In this manner, with respect to the rough program (program voltage Vpgmx), a distribution 999 of the memory cells MC connected to the selected word line WLs is formed.

In the rough program, the verification (verify operation, program verify) of the voltage value of the threshold voltage of the memory cell with respect to the application of the program voltage Vpgmx is not executed. The rough program is finished after the application of the program voltage Vpgmx.

Note that an erase operation may be executed before the rough program.

The details of FIG. 9 will be described later.

<S2>

As illustrated in FIG. 8, after the execution of the rough program, the sequencer 15 executes a determination operation (read operation) of threshold voltages for the memory cells connected to a certain selected word line.

In this read operation, the sequencer 15 determines whether the values of the threshold voltages of the memory cells MC are within a certain voltage range. For example, the sequencer 15 executes the read operation by using two determination levels VL and VH.

The voltage value of the determination level VL is lower than the voltage value of the determination level VH. For example, the voltage values of the determination levels VL and VH can be obtained by an experiment or by simulation. The determination levels VL and VH are set as appropriate, based on the threshold voltage distribution 999 formed by the rough program.

For example, as illustrated in FIG. 9, the voltage value of the determination level VL is lower than the voltage value of the central value Vx of the threshold voltage distribution 999 formed by the rough program. The voltage value of the determination level VH is higher than the voltage value of the central value Vx. The voltage value of the determination level VL is higher than a minimum value of the threshold voltage distribution 999. The voltage value of the determination level VH is lower than a maximum value of the threshold voltage distribution 999.

Note that the value of the program voltage Vpgmx may be set such that the central value (voltage value) Vx of the distribution of the threshold voltages of the memory cells becomes a middle value between the determination level VL and the determination level VH. For example, the value of the program voltage Vpgmx of the rough program may be set by an experiment or by simulation, in accordance with the determination level VL and the determination level VH.

At the time of the read using the determination level VL, the memory cells (e.g. memory cells in a region Qa in FIG. 9) MC having threshold voltages, which are equal to or less than the determination level VL, are set in the ON state, and the memory cells MC having threshold voltages, which are higher than the determination level VL, are set in the OFF state.

At the time of the read using the determination level VH, the memory cells MC having threshold voltages, which are equal to or less than the determination level VH, are set in the ON state on, and the memory cells MC (e.g. memory cells in a region Qb in FIG. 9) having threshold voltages, which are higher than the determination level VH, are set in the OFF state.

Memory cells, which are set in the OFF state when the determination level VL is applied and set in the ON state when the determination level VH is applied, have threshold voltages within a range Qc which is higher than the determination level VL and is equal to or less than the determination level VH.

Specifically, the memory cells which are set in the ON state at both the determination levels VL and VH, and the memory cells which are set in the OFF state at both the determination levels VH and VL, have threshold voltages included in the region Qa and region Qb outside the range Qc.

Hereinafter, a threshold voltage (voltage value) which is equal to or less than the determination level VL, and a threshold voltage (voltage value) which is higher than the determination level VH, are referred to as "off-values". Hereinafter, memory cells (memory cells in the region Qa, Qb) MC having threshold voltages of off-values are referred to as "off-value cells".

In this manner, based on the detection result of the ON or OFF at the determination level VL, VH, the memory cells having threshold voltages within the range Qc and the memory cells (off-value cells) having threshold voltages outside this range are determined.

For example, the ON or OFF of memory cells is determined by the sense amplifier 20 detecting the occurrence of electric current in the bit line (or a variation of potential of the bit line), in the substantially same manner as in the read of user data.

Figure 10:
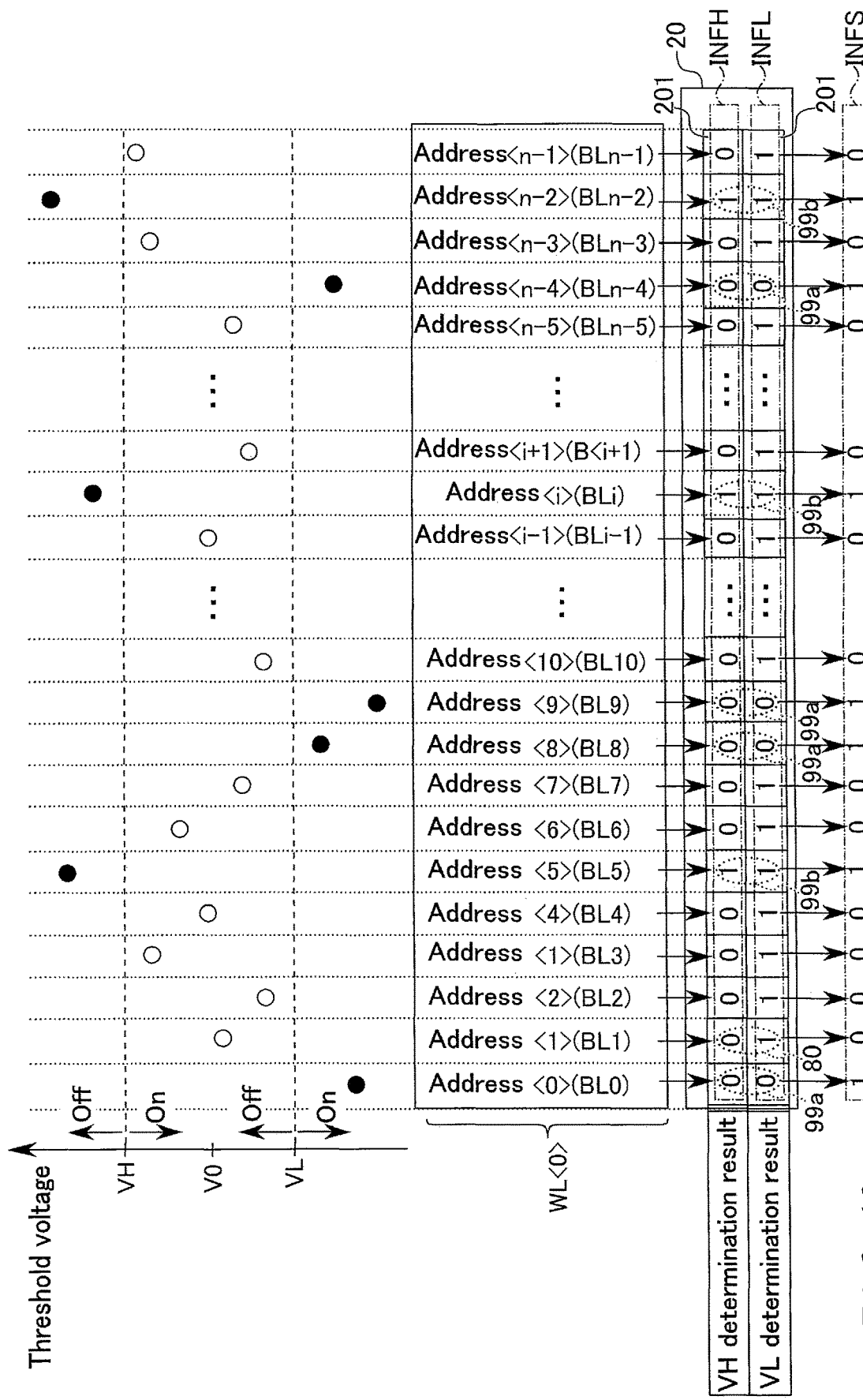

FIG. 10 is a view schematically illustrating a process at a time of a read operation using the determination level VL, VH.

The determination result of the threshold voltage of the memory cell using the determination level VL, VH is temporarily stored in the latch circuit 201 of each sense amplifier circuit 200 of the sense amplifier 20.

For example, when the memory cell connected to the latch circuit 201 is a memory cell which is set in the ON state at the determination level VL, "0" is stored in this latch circuit 201. When the memory cell connected to the latch circuit 201 is a memory cell which is set in the OFF state at the determination level VL, "1" is stored in this latch circuit 201.

In the example of FIG. 10, memory cells of an address <0> (bit line BL0), an address <8> (bit line BL8), an address <9> (bit line BL9), and an address <n−4> (bit line BLn−4) are memory cells (off-value cells) having threshold voltages which are equal to or less than the determination level VL.

Signals ("0") indicative of the ON state with respect to the determination level VL are stored in the corresponding latch circuits 201 as parts of the determination result of the determination level VL via the bit lines BL corresponding to the address <0>, address <8>, address <9>, and address <n−4>.

As regards the memory cells of the other addresses, signals ("1") indicative of the OFF state with respect to the determination level VL are stored in the corresponding latch circuits 201 as parts of the determination result of the determination level VL.

The thus obtained determination result of the determination level VL is information INFL for generating unique information INFS.

For example, when the memory cell connected to the latch circuit 201 is a memory cell which is set in the ON state at the determination level VH, "0" is stored in this latch circuit 201. When the memory cell connected to the latch circuit 201 is a memory cell which is set in the OFF state at the determination level VH, "1" is stored in this latch circuit 201.

For example, memory cells of an address <5> (bit line BL5), an address <i> (bit line BLi), and an address <n−2> are memory cells (off-value cells) having threshold voltages which are higher than the determination level VH.

Signals ("1") indicative of the OFF state with respect to the determination level VH are stored in the corresponding latch circuits 201 as parts of the determination result of the determination level VH via the bit lines BL corresponding to the address <5>, address <i>, and address <n−2>.

As regards the memory cells of the other addresses, signals ("0") indicative of the ON state with respect to the determination level VH are stored in the corresponding latch circuits 201 as parts of the determination result of the determination level VH.

The thus obtained determination result of the determination level VH is information INFH for generating the unique information INFS.

In this manner, the information INFL, INFH of the ON or OFF relating to the determination level VL, VH is stored in the latch circuit 201 corresponding to the address (memory cell number, bit line number) of the memory cell.

For example, when the data (information INFL and information INFH) in the latch circuit 201 is expressed by "00" or "11", each of the memory cells MC corresponding to the latch circuit 201 has an off-value 99 (99a, 99b).

On the other hand, when the data in the latch circuit 201 is represented by the result of the information INFH="0" relating to the determination level VH, and the result of the information INFL="1" relating to the determination level VL, the memory cell MC corresponding to the latch circuit 201 has the threshold voltage of a value (hereinafter, also referred to as "hit value") 80 in the range Qc.

In this manner, off-value cells can be determined from among the memory cells MC connected to the selected word line of the target of determination (read).

The information, which can specify the cell number (bit line number) of at least one off-value cell 99a at the determination level VL, is stored in the sense amplifier 20 as the information INFL.

The information, which can specify the cell number of at least one off-value cell 99b at the determination level VH, is stored in the sense amplifier 20 as the information INFH.

<S3>

In the inside of the flash memory 1, the sequencer 15 executes a calculation process using the information in the latch circuit 201.

The result of the calculation process becomes the unique information INFS that is obtained from the unique information generation block of the flash memory 1.

For example, when an XOR operation is executed, the value indicative of the off-value cell becomes "1", and the value indicative of the memory cell having the threshold voltage in the range Qc becomes "0".

In this manner, as regards the unique information INFS, the address (cell number, position) of the memory cell having the off-value in the selected word line is reflected as the position of the digit of "1" in the bit string of data.

As a result, in the present embodiment, the data of the bit string of "0" and "1", which corresponds to the characteristics of the memory cells MC connected to one selected word line WLs (e.g. word line WL0) of the selected string unit of the unique information generation block, is set. In this embodiment, as regards the memory cells MC connected to the selected word line WLs, the position (address or cell number) of the memory cell having the threshold voltage of the off-value is reflected at the position of the bit string of the data of the unique information.

Note that the memory cell, which is in the OFF state at the determined level VH, is a memory cell having a high write speed in the rough program. On the other hand, the memory cell, which is in the ON state at the determined level VL, is a memory cell having a low write speed in the rough program, compared to the memory cell which is in the OFF state at the determined level VH.

When the write speed in the memory cell and the properties of the tunnel insulating film are taken into account, the information using the memory cell, which is set in the ON state at the determination level VL, can keep high reliability over a long time, compared to the information using the memory cell which is set in the ON state at the determination level VH.

Therefore, the unique information may be set by using only the determination result (information INFL) of the ON or OFF of the memory cell which is set in the ON state at the determination level VL.

Conversely, the information INFH relating to the determination level VH may be used as the unique information.

<S4>

The sequencer 15 sends to the controller 7 the unique information INFS (information INFL, INFH) obtained from the determination operation.

The controller 7 sends the unique information INFS to the host device 9A.

The information, which is sent to the host device 9A, may be the information INFL of the determination result of the determination level VL, or the information INFH of the determination result of the determination level VH.

<S5>

The sequencer 15 determines whether or not the determination operation for generating the unique information of a particular number of bits has been executed a predetermined number of times.

<S6>

When the determination operation has been executed the predetermined number of times (Yes in S5), the sequencer 15 terminates the determination operation since the unique information of the particular number of bits is obtained.

When the determination operation has not been executed the predetermined number of times (No in S5), the sequencer 15 executes the process of S1 to S5 until the number of times of execution of the determination operation reaches the predetermined number of times, while changing the selected address that is the object of the read operation.

The process may proceed to S1 after executing the erase operation for the selected address (e.g. the entire block including the selected address, or a partial area including the selected address in the block), and then the rough program may be executed once again.

For example, a plural number of times of the program operations and a plural number of the read operations may be executed in order to improve the reliability of the unique information. For example, an address of a memory cell having a threshold voltage, which is determined to be an off-value in a certain number or more of times of rough program among a k-number (k is an integer of 1 or more) of times of rough program, may be specified as the position of the off-value cell.

Note that when the host device 9A has determined that the number of off-value cells is less than a particular number or is greater than a particular number, the voltage value of the level VL, VH may be changed, and the above process of S1 to S5 may be executed.

<S01>

The host device 9A receives the unique information INFS (or information INFL or INFH) of the flash memory 1 from the memory system SYS.

In the host device 9A, the unique information processing circuit 93 receives the unique information INFS of the flash memory 1 from the memory system SYS.

The unique information processing circuit 93 executes a certain process on the unique information INFS. Note that the unique information processing circuit 93 may receive the information INFL, INFH relating to the determination result of the determination level VL, VH from the memory system SYS, and may generate the unique information INFS.

The unique information processing circuit 93 generates, with use of well-known art, a digital signature (electronic signature) by using certain information (e.g. key information such as a digital information generation key). Note that the digital signature is a signature of digital information, which can be generated by only a person having specific secret information. A third person can inherit the fact that the digital signature is correct, but cannot substantially counterfeit the signature.

The unique information processing circuit 93A imparts the generated digital signature to the unique information INFS.

In this manner, the host device 9A generates the unique information (for example, also called "key information" or "unique key") INFS1 that is the unique information INFS to which the digital signature is imparted.

<S02>

The host device 9A instructs the memory system SYS to write the unique information INFS1. The host device 9A sends the unique information INFS1 to the memory system SYS.

<S7>

The memory system SYS receives the unique information INFS1.

The controller 7 sends a write command, the address of a protection block BLKb, and the unique information INFS1 to the flash memory 1.

In the flash memory 1, the sequencer 15 writes, by a well-known operation, the unique information INFS1 into the protection block BLKb in accordance with the write command.

Note that the digital signature may not be imparted to the unique information INFS, and the unique information (e.g., either the unique information INFS, or the information INFL, INFH) without the digital signature may be written in the protection block BLKb of the flash memory 1.

Thereafter, the host device 9A writes certain information (e.g. content data) DTa into the flash memory 1 of the memory system SYS.

For example, information associated with the unique information INFS1 may be imparted to the information DTa that is written in the memory system SYS.

As described above, in the memory system of the present embodiment, the unique information of the flash memory is generated.

Note that, instead of the host device 9A, the controller 7 of the memory system SYS may instruct the above-described various processes for generating the unique information.

Various conditions (the selected address, the voltage value of rough program, the voltage values of the determination levels) for generating the unique information may be written, as history information, in a certain area (e.g. protection block BLKb) of the flash memory 1.

<Authentication Process>

Figure 12:
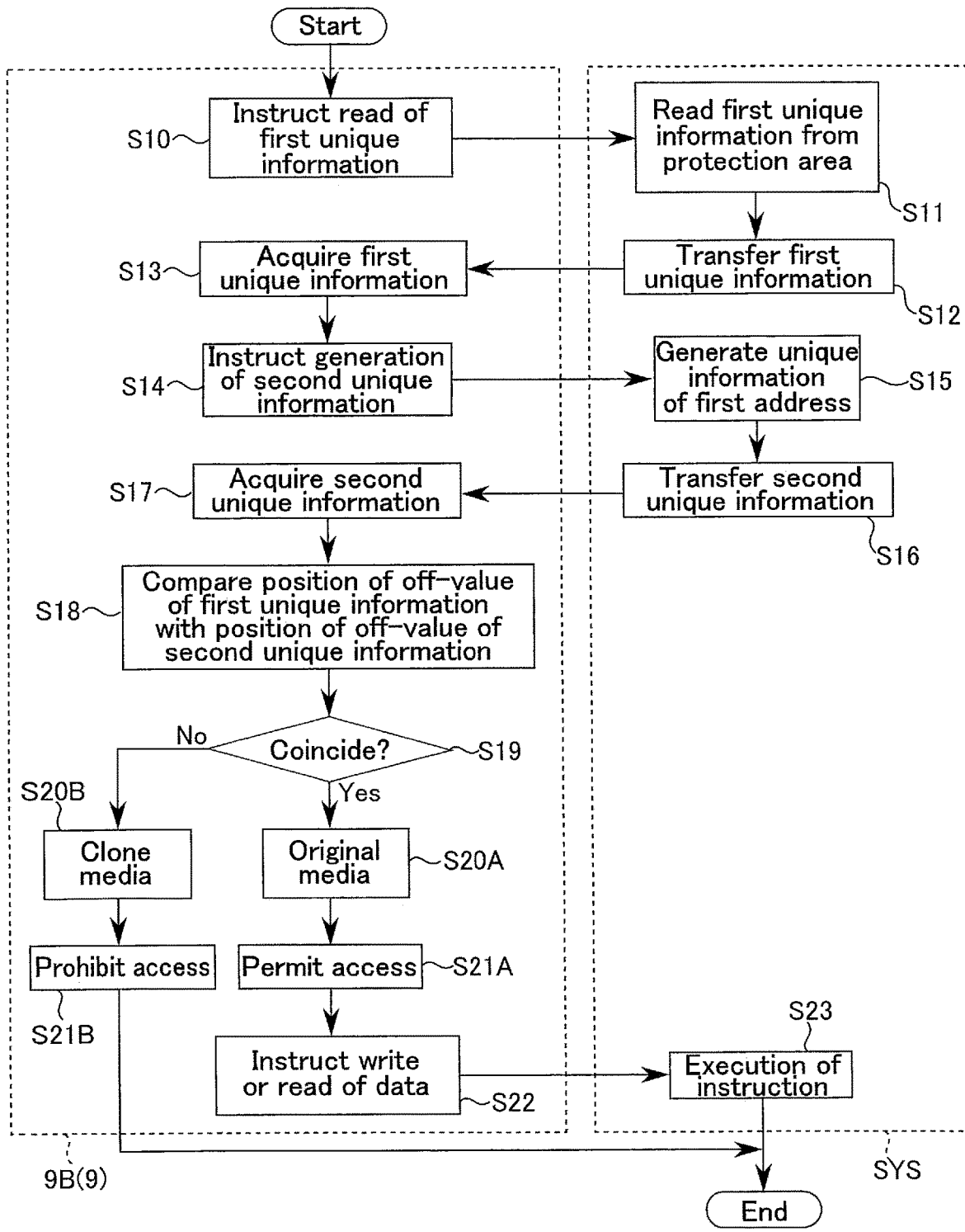
FIG. 12 is a flowchart illustrating an operation example of the memory system of the embodiment.

Referring to FIG. 11 and FIG. 12, a description will be given of an authentication process using the unique information of the flash memory in the memory system of the present embodiment.

FIG. 11 is a view schematically illustrating the authentication process using the unique information in the memory system of the present embodiment.

FIG. 11 exemplarily illustrates, as an example of the host device 9, a host device 9B which executes the authentication process using the unique information. The host device 9B is electrically connected to the memory system SYS of the present embodiment, in order to access the data (information) DTa in the memory system SYS.

Note that the host device 9B may be, in one case, the host device 9A used for generating the unique information of the memory system SYS (flash memory 1), or may be, in another case, a host device having a different configuration.

In the memory system SYS, a flash memory 1X stores data (e.g. content data and secret data) DTa and unique information INFS1 (an example of first unique information). For example, the unique information INFS1 is stored in the protection area (e.g. protection block) BLKb. The data DTa is stored in the protection area BLKb or in the user block BLKc.

In a manner as will be described below, the memory system of the present embodiment executes a determination process and an authentication process using the unique information of the flash memory.

FIG. 12 is a flowchart for describing the determination process using the unique information in the memory system of the present embodiment.

<S10>

The host device 9B starts access to the data DTa in the memory system SYS, by the processor 90 executing the access program AP.

At this time, in order to authenticate the access to the data DTa, the host device 9B reads the unique information INFS1 in the protection block BLKb of the flash memory 1X as an authentication key of the access program AP.

The host device 9B instructs the memory system SYS to read out the unique information INFS1.

<S11>

The controller 7 of the memory system SYS sends a read command and an address to the flash memory 1X in accordance with the instruction (request) from the host device 9B. The flash memory 1X reads the unique information INFS1 from the protection block BLKb. The flash memory 1X sends the read unique information INFS1 to the controller 7.

<S12>

The memory system SYS sends the unique information INFS1, which is read from the flash memory 1X, to the host device 9B.

<S13>

The host device 9B acquires the unique information INFS1 from the memory system SYS. For example, in the host device 9B, the authentication processing circuit 94B receives the unique information INFS1.

<S14>

The host device 9B instructs the memory system SYS to generate unique information INFS2 (an example of second unique information) using a particular address (first address) in the flash memory 1X.

<S15>

Responding to the instruction from the host device 9B, the memory system SYS generates the unique information INFS2 using the particular address of the flash memory 1X, by the above-described unique information generation processes S1 to S4 of FIG. 8.

For example, in the flash memory 1X of the memory system SYS, the sequencer 15 executes, based on the standard (or history information of generation of unique information) for generating the unique information, the rough program (S1 in FIG. 8) of the same condition as when the first unique information INFS1 was generated, for the address having the same value as the address number used in the generation of the first unique information INFS1 (e.g. the first word line WL0 of the first string unit SU0 of the unique information generation block BLKa).

After the rough program, the sequencer 15 determines the magnitude of the threshold voltage of the memory cell after the rough program, by using the same determination level as the determination level VH, VL used when the first unique information INFS1 was generated (S2 in FIG. 8).

Thereby, the determination result of the determination level VH, VL in the memory cells belonging to the selected address is detected.

The sequencer 15 sends the information INFH, INFL, which is the determination result of the determination level VH, VL, or the information INFS, which is the result of the calculation process (S3 in FIG. 8) for the determination result, to the controller 7 as second unique information INFS2 (S4 in FIG. 8).

<S16>

The memory system SYS sends to the host device 9B the unique information INFS2 that is based on the particular address of the flash memory 1X.

<S17>

The host device 9B acquires the unique information INFS2.

For example, in the host device 9B, the unique information processing circuit 92 receives the unique information INFS2. The unique information processing circuit 92 executes various processes on the unique information INFS2.

<S18, S19>

In the host device 9B, the authentication processing circuit 94B compares the unique information INFS2, which is generated from the unique information generation block BLKa of the flash memory 1X, with the first unique information INFS1 which is read from the protection block BLKb.

The authentication processing circuit 94B determines whether the position (bit position) of the off-value ("1") in the bit string of the unique information INFS2 coincides with the position (bit position) of the off-value ("1") in the bit string of the unique information INFS1.

As described above, the positions of off-values in the unique information INFS2 depend on the variance in characteristics of the memory cells connected to the first word line WL0 of the first string unit SU0 of the unique information generation block BLKa of the flash memory 1. Therefore, the unique information INFS1, INFS2 varies from flash memory to flash memory.

<S20A>

When the position of the off-value ("1") of the unique information INFS2 coincides with the position of the off-value ("1") of the unique information INFS1 (Yes in S19), the authentication processing circuit 94B determines that the memory system SYS is the original media (valid media).

<S21A>

The authentication processing circuit 94B notifies the processor 90 of the determination result.

When the unique information INFS1 and the unique information INFS2 coincide with each other, the processor 90 permits the access to the flash memory 1X of the memory system SYS, based on the notification.

<S22>

The host device 9B sends a host command to the memory system SYS. Thereby, the host device 9B accesses the data DTa.

<S23>

Based on the instruction from the host device 9B, the memory system SYS executes various processes on the data DTa.

Thereby, the process for the memory system SYS in the case in which the memory system SYS is the original media is finished.

<S20B>

When the position of the off-value ("1") of the unique information INFS2 does not coincide with the position of the off-value ("1") of the unique information INFS1 (No in S19), it is determined that the flash memory 1X having the unique information INFS2 is different from the flash memory 1 having the unique information INFS1 that is associated with the data DTa.

Therefore, the authentication processing circuit 94B determines that the memory system SYS having the unique information INFS2 is a clone media (unlawful media). The clone media is a recording medium which stores unlawfully copied data.

<S21B>

The authentication processing circuit 94B notifies the processor 90 of the determination result.

When the unique information INFS1 and the unique information INFS2 do not coincide with each other, the processor 90 prohibits the access to the memory system SYS, based on the notification.

Thereby, the process for the memory system SYS in the case in which the memory system SYS is the clone media is finished.

According to the present embodiment, even when the unique information INFS1 is copied to another memory system. SYS (flash memory 1X), the data DTa in the flash memory 1X can be protected.

In this manner, the memory system and host device of the present embodiment can disable the use of the clone media by the determination process (authentication) using the unique information INFS2 obtained from the unique information generation block BLKa and the unique information INFS1 in the protection block BLKb.

As a result, the memory system of the present embodiment can prevent circulation of clone media.

Note that the authentication process (determination process) using the two unique information pieces INFS1 and INFS2 in the above-described embodiment is merely an example. The determination process as to whether the memory system is the original media or not may be executed by some other process, if the process uses the unique information obtained by the method of the present embodiment.

(c) Modifications

Figure 13:
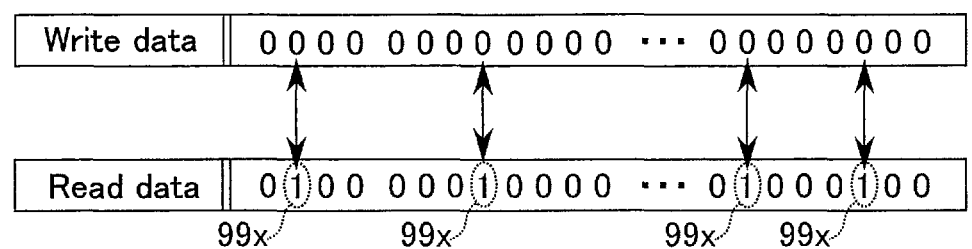
FIG. 13 is a view illustrating a modification of the memory system of the embodiment.

Referring to FIG. 13, a modification of the memory system of the embodiment will be described.

FIG. 13 is a schematic view for describing a modification of the memory system of the embodiment.

In the present embodiment, the unique information of the flash memory may be generated by writing specific data in the unique information generation area BLKa by a normal write operation.

As illustrated in FIG. 13, at the time of generating the unique information, the unique information processing circuit 93 provides data (e.g. "0000 . . . 0000") having a specific arrangement of "1" and/or "0" to the flash memory 1 as write data.

The sequencer 15 programs the write data from the unique information processing circuit 93 into the memory cells MC of the selected word line WLs in the unique information generation block BLKa.

The sequencer 15 executes data read for the memory cells MC in which the write data is written.

The sequencer 15 sends the read data to the unique information processing circuit 93.

The unique information processing circuit 93 compares the read data and the write data.

The unique information processing circuit 93 determines that the positions of bits 99x, in which the bits in the read data and the bits in the write data have different values, correspond to the positions of the memory cells having off-values.

Thereby, the unique information of the flash memory is generated based on the positions of the bits in which the read data and the write data are different.

(d) Conclusion

In recent years, unlawful copy of data is increasing. In order to protect data, various encryption technologies and authentication technologies have been researched and developed.

For example, there is known content distribution which makes use of a memory system using a flash memory. In the content distribution, the protection technology for preventing unlawful copy of content is important.

The characteristics of memory cells in a flash memory vary from flash memory chip to flash memory chip. Therefore, information obtained from memory cells belonging to a certain address in the flash memory can indicated unique information of the flash memory.

In the memory system of the present embodiment, a program operation is executed on the memory cells connected to a certain word line in a certain block. In the embodiment, as regards each of the memory cells having threshold voltages shifted by the program operation, it is determined whether the threshold voltage of the memory cell falls within a certain range, by using certain determination levels.

Based on the determination result, the unique information of the flash memory is set in the memory system of the present embodiment.

In this manner, in the present embodiment, the unique information of the flash memory is generated based on analog characteristics of the memory cells.

Therefore, the copy of the unique information of the flash memory 1, which is generated in the present embodiment, is impossible in principle.

Thus, according to the memory system of the present embodiment, data can be protected.

(Others)

In the present embodiment, a NAND flash memory is exemplarily illustrated as a memory device used in the memory system. However, the memory device used in this embodiment may be a memory device other than the NAND flash memory.

For example, as the memory device of the present embodiment, use may be made of a NOR flash memory, a magnetic memory (e.g. MRAM, domain wall memory), a phase-change memory (e.g. PCRAM), or a resistance-change memory (e.g. ReRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a memory device configured to store data; and
a controller configured to control an operation for the memory device, wherein
the memory device is configured to:
execute a program operation by a first program voltage on a plurality of memory cells belonging to a first address of the memory device;
detect a first memory cell or a second memory cell among the plurality of memory cells by using a first determination level and a second determination level higher than the first determination level for a threshold distribution corresponding to the program operation, the first memory cell having a first threshold voltage of a value equal to or lower than the first determination level, the first threshold voltage being included in the threshold distribution corresponding to the program operation, the second memory cell having a second threshold voltage of a value higher than the second determination level, and the second threshold voltage being included in the threshold distribution corresponding to the program operation; and
generate unique information of the memory device based on positions of the first and second memory cells in the first address, the unique information including a first value based on the first and second memory cells and a second value based on a third memory cell other than the first and second memory cells among the plurality of memory cells belonging to the first address, the second value being different from the first value.

2. The memory system according to claim 1, wherein
the first memory cell is set in an OFF state at both the first and second determination levels, and
the second memory cell is set in an ON state at both the first and second determination levels.

3. The memory system according to claim 1, wherein the program operation is executed without verify after the program operation by the first program voltage.

4. The memory system according to claim 1, wherein the memory device includes:
a first block to be used for generating the unique information, the first block including the memory cells belonging to the first address; and
a second block configured to store the unique information.

5. The memory system according to claim 4, wherein
the memory device further includes a third block configured to store first data, and
an access to the first data stored in the third block is authenticated by using the unique information stored in the second block.

6. The memory system according to claim 1, wherein the memory device includes a NAND flash memory.

7. A memory device comprising:
a memory cell array configured to store data; and
a circuit configured to control an operation for the memory cell array, wherein
the circuit is configured to:
execute a program operation by a first program voltage on a plurality of memory cells belonging to a first address of the memory cell array;
detect a first memory cell or a second memory cell among the plurality of memory cells by using a first determination level and a second determination level higher than the first determination level for a threshold distribution corresponding to the program operation, the first memory cell having a first threshold voltage of a value equal to or lower than the first determination level, the first threshold voltage being included in the threshold distribution corresponding to the program operation, the second memory cell having a second threshold voltage of a higher than the second determination level, and the second threshold voltage being included in the threshold distribution corresponding to the program operation; and
generate unique information of the memory device based on positions of the first and second memory cells in the first address, the unique information including a first value based on the first and second memory cells and a second value based on a third memory cell other than the first and second memory cells among the plurality of memory cells belonging to the first address, the second value being different from the first value.

8. The memory device according to claim 7, wherein
the first memory cell is set in an OFF state at both the first and second determination levels, and
the second memory cell is set in an ON state at both the first and second determination levels.

9. The memory device according to claim 7, wherein the program operation is executed without verify after the program operation by the first program voltage.

10. The memory device according to claim 7, wherein the memory cell array includes:
a first block to be used for generating the unique information, the first block including the memory cells belonging to the first address; and
a second block configured to store the unique information.

11. The memory device according to claim 10, wherein
the memory cell array further includes a third block configured to store first data, and
an access to the first data stored in the third block is authenticated by using the unique information stored in the second block.

12. The memory device according to claim 7, wherein
the memory cell array includes a plurality of strings, and
each of the strings includes a first transistor, a second transistor, and a plurality of memory cells connected in series between the first and second transistors.

13. The memory device according to claim 7, wherein the memory device includes a NAND flash memory.

14. A control method of a memory system including a memory device, the control method comprising:
executing a program operation by a first program voltage on a plurality of memory cells belonging to a first address of the memory device;
detecting a first memory cell or a second memory cell among the plurality of memory cells by using a first determination level and a second determination level higher than the first determination level for a threshold distribution corresponding to the program operation, the first memory cell having a first threshold voltage of a value equal to or lower than the first determination level, the first threshold voltage being included in the threshold distribution corresponding to the program operation, the second memory cell having a second threshold voltage of a value higher than the second determination level, and the second threshold voltage being included in the threshold distribution corresponding to the program operation; and generating unique information of the memory device based on positions of the first and second memory cells in the first address, the unique information including a first value based on the first and second memory cells and a second value based on a third memory cell other than the first and second memory cells among the plurality of memory cells belonging to the first address, the second value being different from the first value.

15. The control method according to claim 14, wherein the first memory cell is set in an OFF state at both the first and second determination levels, and
the second memory cell is set in an ON state at both the first and second determination levels.

16. The control method according to claim 14, wherein the program operation is executed without verify after the program operation by the first program voltage.

17. The control method according to claim 14, further comprising:
executing authentication of access to first data in the memory device, based on the unique information.

18. The control method according to claim 17, wherein the memory device includes a first block, a second block, and a third block,
the unique information is generated using the first block including the memory cells belonging to the first address,
the unique information is stored in the second block,
the first data is stored in the third block, and
the access to the first data is authenticated by using the unique information stored in the second block.

19. The control method according to claim 14, wherein the memory device includes a NAND flash memory.

* * * * *